3,007,041
CLOSURE BAFFLE FOR JUNCTION BOXES
Arthur W. Matteson, Lakewood, Ohio, assignor, by mesne assignments, to Wakefield Corporation, Detroit, Mich., a corporation of Michigan
Filed Dec. 16, 1959, Ser. No. 860,039
2 Claims. (Cl. 240—78)

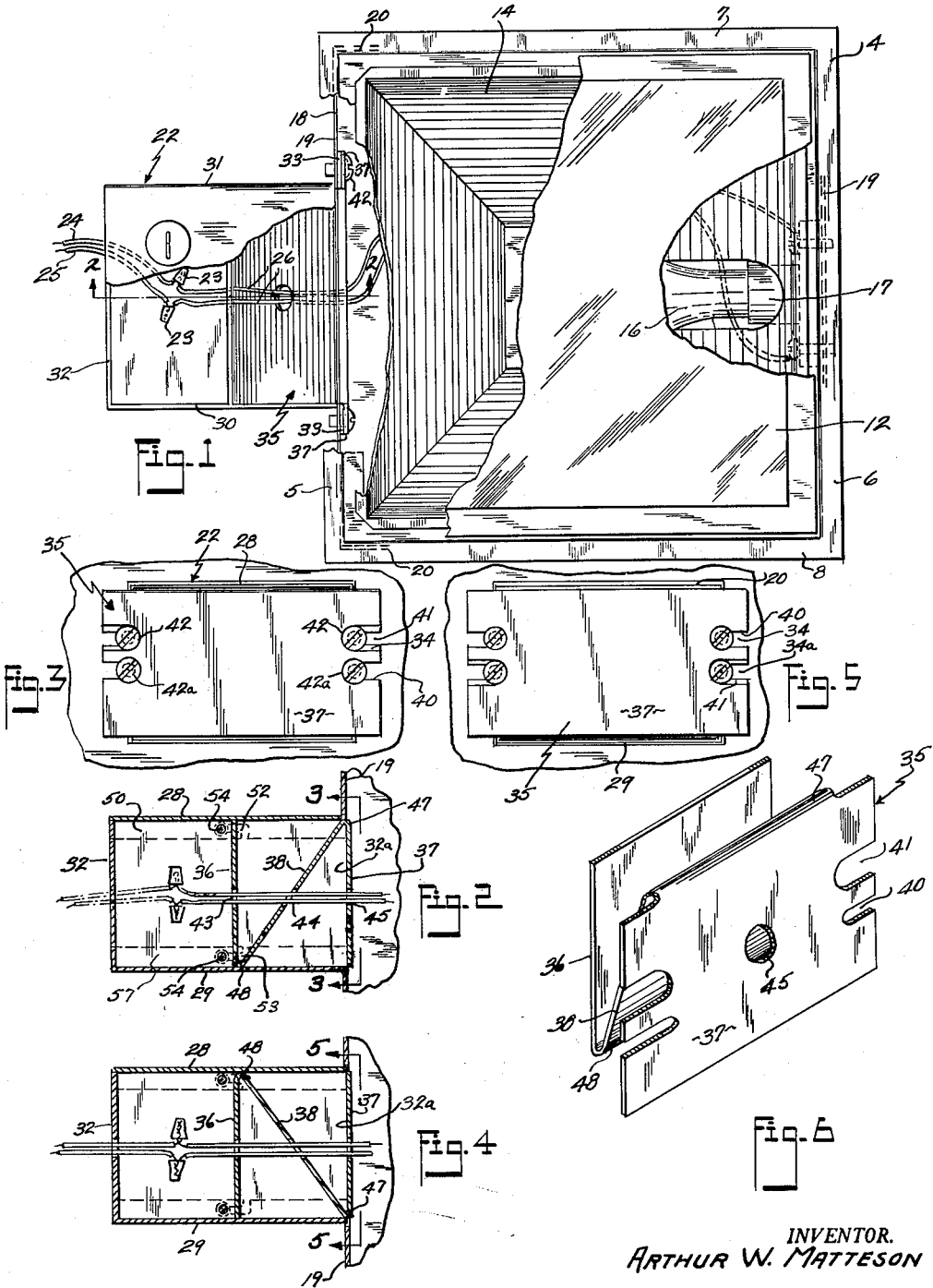

This invention relates to recessed type lighting fixtures in which the light diffusing reflector and supporting frame for the fixture housing are mounted flush with the ceiling or wall surface. The invention more particularly relates to junction boxes which may be attached to the housing of the recessed lighting fixture.

The present invention provides a junction box which can be attached to recessed lighting fixture thereby saving time, material, and labor during installation and also adding a pleasing appearance to the light fixture. According to the present invention, a convenient, labor saving junction box can be attached to the lighting fixture itself and yet the temperature of electrical connections inside the junction box do not reach a predetermined maximum safety temperature say, of about 60° centigrade. The temperature inside the junction box is held to a relatively low temperature even though substantial heat is built up inside the recessed lighting fixture proper by using an inexpensive, yet very effective heat baffle means between the light source and connections.

It is an object of the present invention to provide an inexpensive baffle means to prevent overheating of connections of electrical wires inside of a junction box attached to a recessed lighting fixture.

It is an object to provide a means of permitting the attachment of junction boxes to recessed lighting fixture housings to thereby save time, material and labor.

These and other objects will be apparent from the specification, appended claims, and from the drawings in which:

FIG. 1 is a fragmentary view of a recessed lighting fixture having an attached junction box and embodying the heat baffle means of the present invention with parts broken away;

FIG. 2 is a fragmentary sectional view taken on the line indicated at 2—2 in FIG. 1;

FIG. 3 is a front elevational view of the baffle means assembled in the junction box according to the present invention and taken along the line 3—3 indicated in FIG. 2;

FIG. 4 is a fragmentary sectional view of a junction box and an alternate embodiment of a baffle means assembled therein and taken along the line indicated at 2—2 in FIG. 1;

FIG. 5 is a front elevational view showing the alternate embodiment of baffle means assembled in the junction box as shown in FIG. 4 and taken along the line indicated at 5—5 in FIG. 4; and FIG. 6 is a perspective view of the baffle means according to the present invention.

Referring to the drawings, FIG. 1 shows a recessed lighting fixture having a supporting frame 4 with preferably a rectangular outline having sides 5, 6, 7 and 8 adapted to mount flush with a ceiling or wall surface. An optical element comprising a refractor lens or reflector lens 12, an eliptisquare reflector 14 and a light source are supported by the frame 4. The reflector or refractor lens 12, which may be a relatively flat frosted glass sheet, diffuses the light emanating from the light source. The reflector 14, which is preferably made of aluminum or lined with aluminum foil is in contact with and directly supported by the frame 4, while the light source, as seen in FIG. 1, comprises a light bulb 16 and a porcelain socket 17 which is rigidly mounted on a lighting fixture housing 18 which covers and protects the above described optical element parts and forms the interior of the lighting fixture. Housing 18 includes a pair of substantially parallel sides 19, the porcelain socket being mounted on one of the housing sides 19 by means of suitable fasteners. Housing 18 also includes another pair of parallel sides 20 and a top (not shown) to form a generally rectangular housing.

A juncture box 22 is provided for housing electrical connections 23 made by splicing power lines 24 and 25 to electrical conduits 26 which in turn are used to carry electric current to the light source. The box 22 has a pair of substantially parallel top and bottom walls, namely a top wall 28 and a bottom wall 29, a pair of substantially parallel side walls 30 and 31 and a back wall 32. The walls of the junction box form a generally rectangular parallelepiped having all sides enclosed except for an opening 32a at the front end of the box, which opening is about the same size as the back wall 32. Side wall 30 and 31 have a pair of parallel outstanding vertical flanges 33 which straddle the opening 32a and are provided with a pair of the aligned openings 34 and 34a for mounting tthe junction box on the housing 18.

In accordance with the present invention, a heat baffle means comprising a baffle member 35 is provided between the reflector 14 and connections 23 to effectively keep the temperature inside the juncture box relatively low. Underwriters Laboratory, Inc. has approved standard 60° C. building wire, such as Romex R, Romex RT, TW, etc. for direct connections for junction boxes providing the temperature of connections inside the box does not rise above 60° centigrade. Thus, suitable building wires are rubber coated wires, thermoplastic coated wire, and fabric coated wire with or without a paraffin coating. The above wires described can be satisfactorily used providing the wires and the connection made therewith are not exposed to sufficient heat to degrade or melt the coatings.

In accordance with the present invention it has been found that the temperature inside junction box 22 can easily be prevented from reaching 60° C. for instance, by use of the baffle member 35 which has a generally Z-shaped cross section having two substantially parallel aligned end plates 36 and 37 and a diagonal plate 38 which connects the two end plates together along their opposite marginal edges. One of the end plates 36 is a relatively small end plate having an area and a size slightly smaller than that of the other end plate 37, which is a relatively large end plate.

In accordance with the present invention, when the baffle is in operating position inside the junction box (as shown for example in FIGS. 1 and 2) the large end plate 37 fits over the opening 32a at the front end of the junction box 22 and forms a closure or a wall thereon which completely encloses the junction box from all 4 sides, top and bottom. As noted in the drawings, end plate 36 is slightly smaller in area and in size than the cross sectional area of the interior of box 22 and therefore can be easily slid into the interior of the box when assembling the baffle means in the junction box and baffle means. The end plate 36 is thus slightly smaller in area than the back wall 32 of the box which in turn is slightly smaller than the area of the large end plate 37. The area of plate 37 is preferably on the order of 15 to 30 percent larger than that of the small plate 36.

The large end plate 37 has two pairs of horizontally aligned openings 40 and 41 which are provided to secure the junction box and the baffle means to one of the sides of the housing.

The baffle member and junction box are preferably mounted on the housing by first fastening the box 22 to the housing by means of suitable fasteners such as screws 42 through openings 34. The baffle member is then assembled into position and the large end plate 37 is fastened to the housing by screws 42a through opening 40 so that flanges 33 are between the end plate 37 and the housing side 19. As noted in FIG. 3, each of the openings 41 is larger than the openings 40 so that the end plate 37 by-passes the heads of the screws 42 and is fastened flush against the flanges 33 of the junction box.

An inexpensive baffle member may be made of preferably about 18 to 20 gauge steel with a finish, for example, of baked satin aluminum by using a single sheet of steel and bending the sheet into the Z-shape already described. Before the sheet is bent, the sheet can be easily and conveniently cut by a stamping operation to provide a series of aligned holes which form the openings 43, 44, and 45 to permit a passage from electrical conduits through the small end plate, the large end plate and the diagonal plate, respectively, of the baffle member. The stamping operation also provides aligned slots or openings 40 and 41 on one end portion of the steel sheet, which when bent into the Z-shape, forms large end plate 37 of the baffle member. When the sheet is bent, marginal edge 47 is formed between plate 37 and diagonal plate 38 and marginal edge 48 is formed between small end plate 36 and diagonal plate 38.

In accordance with present invention, great advantage in heat insulation action is obtained by the Z-shape of the baffle member. One advantage is the provision of dead air spaces along the top and bottom of the baffle member. As seen in FIG. 2, for example, there is an air space provided between the top of small plate 36 and top of large plate 37 along the top wall 28 of the juncture box. This air space along the top wall of the juncture box and lack of a metal to metal bridge to conduct heat across the baffle member apparently is an important factor in keeping any substantial amount of heat from reaching connections in the junction box from the interior of the recessed lighting fixture. Generally, the amount of heat conducted by convection from the reflector and light source will tend to be greatest at the top of the junction box adjacent top wall 28. As noted in the preferred embodiment shown in FIG. 2, or even the alternate embodiment shown in FIG. 4, the provision of an air space between the parallel end plates adjacent top wall 28 is highly effective in preventing heat from traveling to connections 23.

Another advantage is obtained by the Z-shape. Apparently the heat moving from the reflector to the far end of the junction box through the baffle member is conducted or carried predominately by means of convection rather than conduction or radiation. Diagonal 38 of the Z-shape provides an internal or an interior baffle plate to augment the baffling action or barrier effect of the two end plates 36 and 37 with little loss of heat due to conduction of heat from the large end baffle plate down the diagonal plate to the small end plate. The area of the diagonal plate 38 is preferably about 10 percent to 30 percent greater than the area of the small end plate 36 and the effect of a diagonal baffle plate with a large surface area aids in providing the excellent heat barrier provided according to the present invention.

While as previously indicated, the preferred position of the baffle member 35 is shown in FIGS. 2 and 3, an alternate embodiment of the baffle member assembled in the junction box is shown in FIGS. 4 and 5. Whichever embodiment is used, a maximum length and area of air space is obtained between the end plates 36 and 37 along both the top wall 28 and the bottom wall 29 of the junction box.

Also, for the best heat baffling action, the openings provided in the end plates and diagonal plate to move and support the two electrical wires leading to the light source are preferably only large enough to permit passage of the electric wires without damaging them. In this manner the cross-sectional area of each of the openings 43, 44 and 45 is only 50 to 150 percent larger than that of the wires 26.

A preferred type of inexpensive, commercially used junction box may be formed from 3 sheets of steel in which a single sheet of steel is folded along marginal edges to form flanges 50 for top wall 28 and another sheet is folded along marginal edges to form bottom wall 29 with flanges 51. Meanwhile slotted openings 52 and 53 to receive screws 54 can be provided in the flanges 50 and 51. A third single sheet can be folded to form the top and bottom walls 28 and 29 and the back wall 32 when the sheet is folded into about 3 equal parts. As seen in FIG. 3, the screws 54 are used to fasten the top 28 and bottom 29 to the sides 30 and 31 of the junction box.

When large plate 37 of the baffle member 35 is fastened to flanges 33, the large end plate on the front of the baffle is held securely by screws. The back end of the baffle or the small plate 36 preferably is in contact with the screws 54 which lends rigidly to the baffle member assembly by holding the back end in place.

It is to be understood that, in accordance with the provisions of the patents statutes, the particular form of products shown and described is presented for the purposes of explanation and illustration and that various modifications of said product can be made without departing from my invention.

What is claimed is:

1. In a junction box for use with a lighting fixture having a wall formed with an opening therein, said junction box being mounted on said wall wherein said opening communicates with the interior of said box, said junction box containing connections from a source of electrical power to electrical conductors which extend through said opening into said lighting fixture to thus supply electric current to the same, a heat baffle disposed in said junction box of generally Z-shaped cross section having two substantially parallel spaced end plates and a diagonal plate connecting with opposite edges of said end plates and extending angularly through said junction box, thus defining a pair of heat baffling zones in the same on opposite sides of said diagonal plate, one of said end plates being disposed in said junction box between said connections and said fixture wall and the other of said end plates substantially closing said wall opening, said end plates being substantially perpendicular to the path of travel of heat from said lighting fixture to said junction box.

2. In a junction box as is defined in claim 1, and wherein each of the end plates and diagonal plate of said baffle member is centrally provided with an aperture through which the electrical conductors of said fixture extend and into said junction box.

References Cited in the file of this patent

UNITED STATES PATENTS 2,676,307    McGinty et al.   ---------- Oct. 16, 1956
2,857,508    Klugman   -------------- Oct. 21, 1958